United States Patent
Dai et al.

(10) Patent No.: US 10,405,398 B2
(45) Date of Patent: Sep. 3, 2019

(54) LIGHTING CONTROL SYSTEM FOR PLANT LED LAMPS

(71) Applicants: Self Electronics Co., Ltd., Ningbo, Zhejiang (CN); Wanjiong Lin, Ningbo, Zhejiang (CN); Self electronics USA Corporation, Norcross, GA (US)

(72) Inventors: Jiayun Dai, Zhejiang (CN); Xiaobo You, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 38 days.

(21) Appl. No.: 15/974,388

(22) Filed: May 8, 2018

(65) Prior Publication Data

US 2018/0332685 A1 Nov. 15, 2018

(30) Foreign Application Priority Data

May 10, 2017 (CN) .......................... 2017 1 0324296

(51) Int. Cl.
*H05B 37/00* (2006.01)
*H05B 33/08* (2006.01)
*A01G 7/04* (2006.01)

(52) U.S. Cl.
CPC .......... *H05B 33/0872* (2013.01); *A01G 7/045* (2013.01); *H05B 33/086* (2013.01); *Y02P 60/149* (2015.11)

(58) Field of Classification Search
CPC ............ H05B 33/0815; H05B 33/0818; H05B 41/2828; H05B 41/3921; H05B 41/3927; H05B 41/28; H05B 37/029; H05B 33/0803; H05B 37/0254; H05B 37/02; H05B 41/295; H05B 41/2827; H05B 41/3925; Y02B 20/202
See application file for complete search history.

(56) References Cited

U.S. PATENT DOCUMENTS

2013/0169172 A1* 7/2013 Kesterson .......... H05B 33/0815
315/186
2013/0263503 A1* 10/2013 Bostdorff ............... A01G 7/045
47/58.1 LS (Continued)

*Primary Examiner* — Minh D A
(74) *Attorney, Agent, or Firm* — Wang Law Firm, Inc.

(57) ABSTRACT

A lighting control system for plant LED lamps controls at least one LED lamp, and then at least one of the LED lamps provides lighting for at least one plant. The lighting control system comprises a plant growth stage setting module, a step setting module for respective growth stage, a spectrum adjusting module for LED lamps in each growth stage and an illumination time adjusting module in each growth stage. The spectrum adjusting module in each growth stage is configured to adjust and set the spectrum of the LED lamp provided by different growth stages of the same type of plants. The illumination time adjusting module is configured to adjust the time for growing the different growth stages of the same type of plants. The application allows users to easily control the spectral characteristics of LED lamps, as well as lighting time. At the same time, it is also convenient to control the spectral characteristics and the illumination time of the LED lamps in different regions and different plants so as to make the adjustment of the light emitted by the LED lamps simple and save human cost and time.

7 Claims, 2 Drawing Sheets

(56) References Cited

U.S. PATENT DOCUMENTS

2015/0257243 A1* 9/2015 Saffari ............... H05B 37/0272
   315/113
2016/0113213 A1* 4/2016 Berinsky ................ A01G 7/045
   47/58.1 LS

* cited by examiner

LIGHTING CONTROL SYSTEM FOR PLANT LED LAMPS

CROSS-REFERENCE TO A RELATED APPLICATION

This application claims priority to a Chinese Patent Application No. CN 201710324296.6, filed on May 10, 2017.

FIELD OF THE TECHNOLOGY

The invention relates to the lighting device field, with particular emphasis on a lighting control system for plant LED lamps.

BACKGROUND

In ordinary daily life, all kinds of lighting apparatus can be seen everywhere, such as fluorescent lamps, street lamps, table lamps, artistic lamps and so on. In the above-described lighting apparatus, the tungsten bulb is traditionally used as a light-emitting light source. In recent years, due to the ever-changing technology, light-emitting diode (LED) has been used as a light source. Moreover, in addition to lighting apparatus, for the general traffic signs, billboards, headlights etc., light-emitting diode (LED) has also been used as a light source. The light-emitting diode (LED) as a light source has the advantages of energy-saving and greater brightness. Therefore, it has been gradually common.

With the popularity of LED lamps, more and more occasions start using LED lamps, such as the application of plant-oriented lighting field. In plant-directed lighting, these plants generally grow in insulated greenhouses due to cost, and the LED lamps are used to provide appropriate lighting to promote plant growth in order to shorten the plant growth cycle. However, in order to make full use of the greenhouse space and reduce the cost, a green house generally doesn't grow only one or a kind of plant, and generally doesn't have only one layer but multi-layer planting to improve space utilization, such as planting fungus. Therefore, there will be a lot of LED lamps used in the planting system. Therefore, it will not only waste time, but also increase human cost and the labor intensity of workers if we manually adjust the LED lamps one after another.

SUMMARY OF THE INVENTION

Therefore, it is necessary to provide a lighting control system for plant LED lamps which can conveniently adjust the output of the lamp to meet the above requirements.

A lighting control system for plant LED lamps, configured to control at least one LED lamp wherein at least one of the LED lamps provides lighting for at least one plant, comprising: a plant growth stage setting module, a step setting module for respective growth stage, an spectrum adjusting module for LED lamps in each growth stage and an illumination time adjusting module in each growth stage; the plant growth stage setting module configured to set a growth stage for a certain type of plants, the step setting module for respective growth stage configured to set a growth stage for each growth stage for different growth stages of the same type of plants, the spectrum adjusting module for LED lamps in each growth stage configured to adjust and set the spectrum of the LED lamp provided by different growth stages of the same type of plants, the illumination time adjusting module in each growth stage configured to adjust the time for growing the different growth stages of the same type of plants.

Further, the lighting control system further comprises a plant area selection module for selecting or switching different plant growth areas to adjust the growth parameters of each area.

Further, the spectrum adjusting module for LED lamps in each growth stage is configured to adjust the spectrum of red light of the LED lamp.

Further, the spectrum adjusting module for LED lamps in each growth stage is configured to adjust the spectrum of green light of the LED lamp.

Further, the spectrum adjusting module for LED lamps in each growth stage is configured to adjust the spectrum of far-infrared light of the LED lamp.

Further, the spectrum adjusting module for LED lamps in each growth stage is configured to simultaneously adjust the spectrum of the red light, green light and far-infrared light of the LED lamp.

Further, the plant growth stage setting module divides the growth stage of a certain type of plant into a seedling stage, a growth stage, a flowering stage and a fruiting stage.

Further, the lighting control system further comprises a growth total cycle reference module, and the growth total cycle reference module is configured to compare the total time required for plant growth and the time that has been taken to grow for a certain type.

Compared with the prior art, the application allows users to easily control the spectral characteristics of LED lamps, as well as lighting time. At the same time, it is also convenient to control the spectral characteristics and the illumination time of the LED lamps in different regions and different plants so as to make the adjustment of the light emitted by the LED lamps simple and save human cost and time.

DETAILED DESCRIPTION OF THE DRAWINGS

The drawings described herein are intended to promote a further understanding of the present invention, as follows.

DESCRIPTION OF THE PREFERRED EMBODIMENTS

The present application is illustrated by way of the following detailed description based on of the accompanying drawings. It should be noted that illustration to the embodiment in this application is not intended to limit the invention.

Figure 1:
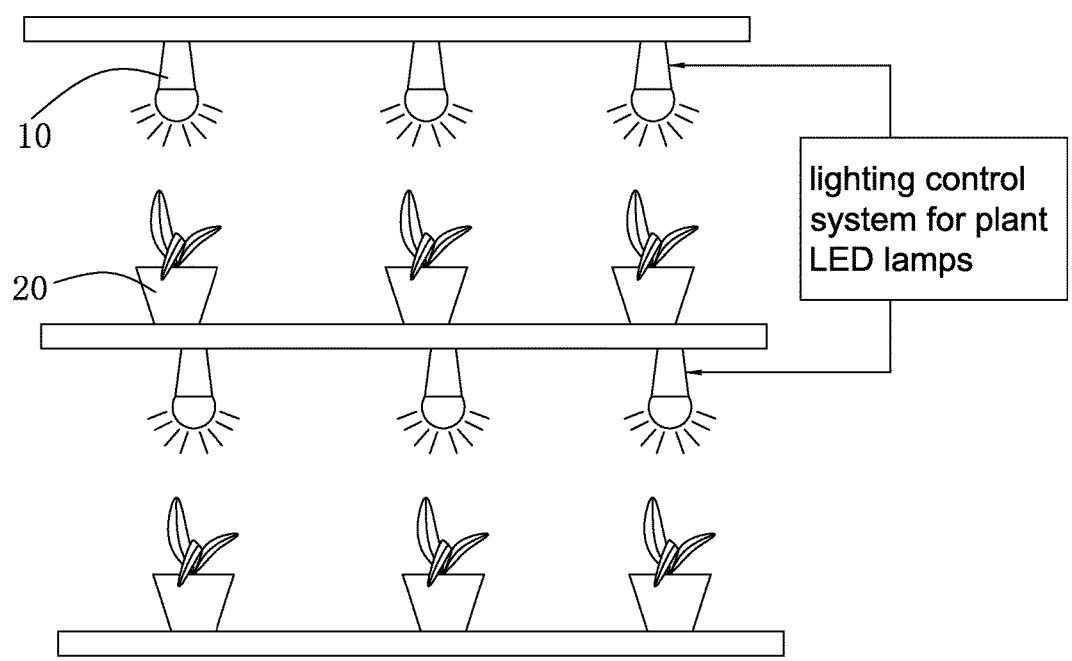
FIG. 1 is a structure diagram of a lighting control system for plant LED lamps provided by the present invention.
Figure 2:
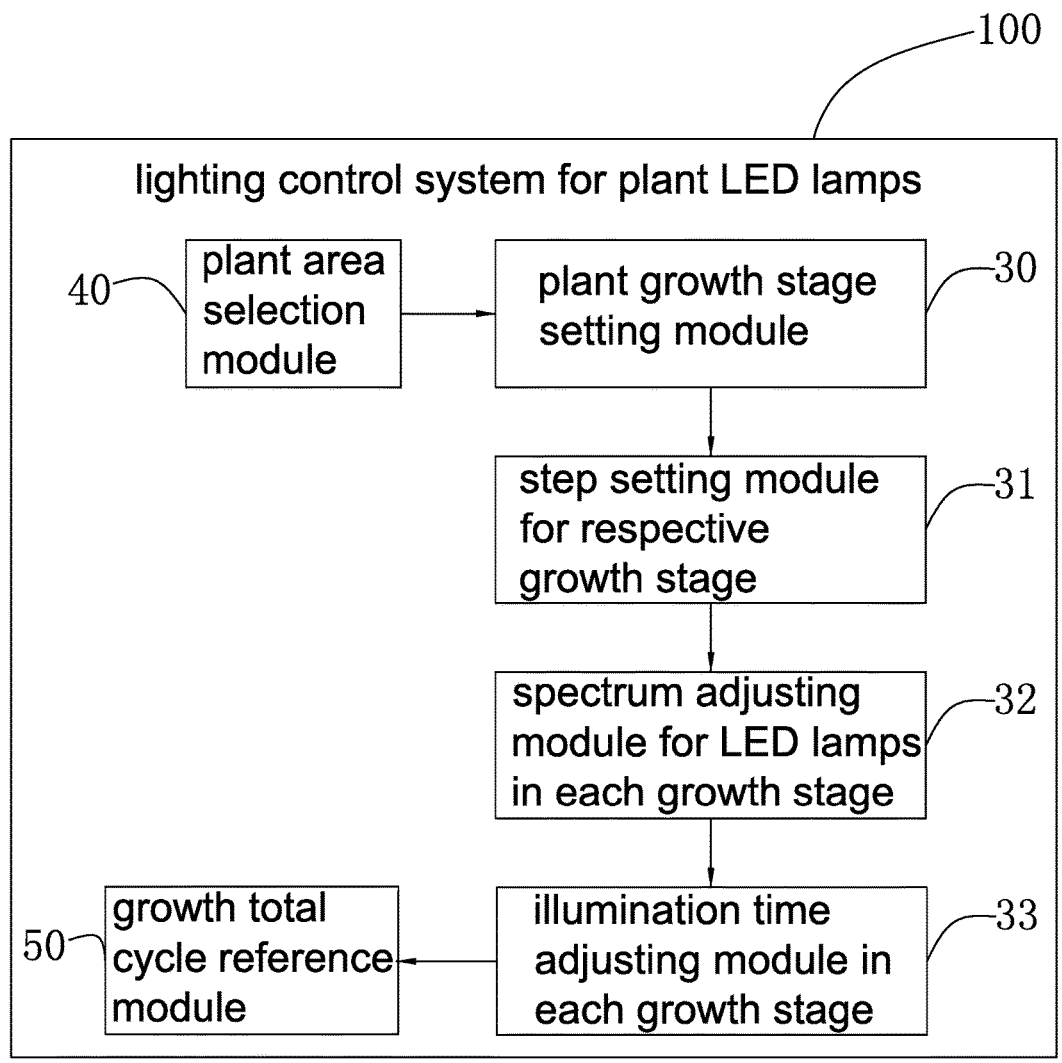
FIG. 2 is a functional block diagram of a lighting control system for plant LED lamps provided by the present invention.

Please referring to FIG.1, FIG. 1 is a structure diagram of a lighting control system 100 for plant LED lamps provided by the present invention. The lighting control system 100 for plant LED lamps is configured for controlling the light output parameters of the at least one LED lamp 10, such as the spectral characteristics of the emitted light, the lighting time, the switch, and the like. The at least one LED lamp 10 is used to provide lighting for at least one plant 20. It is well known to those skilled in the art that any plant which is provided a suitable light source can be well guaranteed in its growth rate and growth quality. The lighting control system 100 for plant LED lamps comprises a plant growth stage setting module 30, a step setting module 31 for respective growth stage, a spectrum adjusting module 32 for LED lamps in each growth stage and an illumination time adjusting module 33 in each growth stage. It is conceivable that the lighting control system 100 for plant LED lamps further comprises other functional modules, such as a central processing module, a power supply module that provides power to the LED lamp 10, a signal transmission module connecting the lighting control system 100 for plant LED lamps and the power supply module. The signal transmission module can convert the digital signal emitted by the lighting control system 100 for plant LED lamps into an analog signal to control the output of the power supply module so as to control the output of the LED lamp 10.

The plant growth stage setting module 30 divides the growth stage characteristics of a certain type of plant into several growth stages. Because a certain type of plant or a plant relative to other types or other kinds of plants, their growth characteristics are different, therefore, in order to control and cater to a certain type of plant or plant growth cycle, people need to provide light following its inherent growth cycle and do watering and fertilizing, so that these plants can grow in accordance with the expectations of people. In the present embodiment, the plant growth stage setting module 30 divides the growth period of a certain type or a certain plant into four stages, that is, a seedling stage, a growth stage, a flowering stage and a fruiting stage. Of course, it is conceivable that the user may also increase the growth stage of the plant according to the actual situation. In each of the above stages, the lighting control system 100 for plant LED lamps controls the LED lamp 10 to provide a suitable illumination spectrum and illumination time. Of course, it is understandable that the illumination spectrum as well as the illumination time can be set by the plant expert, who sets the different spectra and illumination time depending on the plant.

The step setting module 31 for respective growth stage is configured to set a growth stage for each growth stage for different growth stage of the same type of plants. Different stages of growth may have different growth steps or are called sub-stage. For example, one seedling stage includes a germinating step, a single leaf step, a double leaf step, and a multi-leaf step. The illumination spectrum and the illumination time required for each step will be different. Therefore, the step setting module 31 for respective growth stage may allow the user to add or subtract the growth steps of each growth stage according to actual needs.

The spectrum adjusting module 32 for LED lamps in each growth stage is configured to adjust and set the spectrum of the LED lamp provided by different growth stages of the same type of plants. The spectrum adjusting module 32 for LED lamps in each growth stage provides the user with an entrance that allows the user to set the spectral characteristics of the LED lamp 10 for each growth step in each growth stage according to actual plant needs. The spectrum adjusting module 32 for LED lamps in each growth stage is configured to adjust the spectrum of red light of the LED lamp. The spectrum adjusting module 32 for LED lamps in each growth stage is configured to adjust the spectrum of green light of the LED lamp. The spectrum adjusting module 32 for LED lamps in each growth stage is configured to adjust the spectrum of far-infrared light of the LED lamp. Of course, the spectrum adjusting module 32 for LED lamps in each growth stage is configured to simultaneously adjust the spectrum of the red light, green light and far-infrared light of the LED lamp.

The illumination time adjusting module 33 in each growth stage is configured to adjust the time for growing the different growth stages of the same type of plants. The illumination time adjusting module 33 in each growth stage adjusts the illumination time for the user to adjust the growth step of the LED lamp 10 in each stage. The illumination time at each growth step is known to those skilled in the art, and therefore, the illumination time adjusting module 33 in each growth stage allows the user to adjust the illumination time of each growth step.

The lighting control system 100 for plant LED lamps further comprises a plant area selection module 40. Because in a plant growth greenhouse, it is impossible to grow only one plant or a kind of plant, but will grow a large number of plants, each plant becomes a growing area. The growth area can be set up by overlapping or tiling. The plant area selection module 40 is configured for selecting or switching different plant growth areas to adjust the growth parameters of each area, that is, the user can select the plant growth stage setting module 30 and the step setting module 31 for respective growth stage, the spectrum adjusting module 32 for LED lamps in each growth stage and the illumination time adjusting module 33 in each growth stage corresponding to different plants or different growth phase step of the plants through the plant area selection module 40. It can allow the user to set the spectral characteristics and the illuminate time of the LED lamp 10 also.

The lighting control system 100 for plant LED lamps further comprises a growth total cycle reference module 50. The growth total cycle reference module 50 provides such functionality when the user wants to know the total growth time required for a certain type or plant, as well as the time it has been grown. The growth total cycle reference module 50 is configured to compare the total time required for plant growth and the time that has been taken to grow for a certain type, and may take the form of a percentage pattern, that is, the percentage of the time that has taken to grow and the total time required, it can also be the respective time value of the time that has taken to grow and the total time required.

Each of the above modules can be displayed on a screen of a computer or a mobile phone in various forms for users to select and control. At the same time, the implementation methods of the above modules can be programmed by using an existing language program, all of which are well known in the art will not be described in detail here.

Compared with the prior art, the application allows users to easily control the spectral characteristics of LED lamps, as well as lighting time. At the same time, it is also convenient to control the spectral characteristics and the illumination time of the LED lamps in different regions and different plants so as to make the adjustment of the light emitted by the LED lamps 10 simple and save human cost and time.

The above disclosure has been described by way of example and in terms of exemplary embodiment, and it is to be understood that the disclosure is not limited thereto. Rather, any modifications, equivalent alternatives or improvement etc. within the spirit of the invention are encompassed within the scope of the invention as set forth in the appended claims.

The invention claimed is:

1. A lighting control system for plant LED lamps, configured to control at least one LED lamp wherein at least one of the LED lamps provides lighting for at least one plant, comprising:
   a plant growth stage setting module,
   a step setting module for respective growth stage, a spectrum adjusting module for LED lamps in each growth stage and an illumination time adjusting module in each growth stage;

a plant area selection module for selecting or switching different plant growth areas to adjust growth parameters of each plant growth area, the plant growth stage setting module configured to set a growth stage for certain type of plants, the step setting module for respective growth stage configured to set a growth stage for each growth stage for different growth stages of the same type of plants, the spectrum adjusting module in each growth stage configured to adjust and set the spectrum of the LED lamp provided by different growth stages of the same type of plants, the illumination time adjusting module in each growth stage configured to adjust the time for growing the different growth stages of the same type of plants.

2. The lighting control system as claimed in claim 1, wherein the spectrum adjusting module for LED lamps in each growth stage is configured to adjust the spectrum of red light of the LED lamp.

3. The lighting control system as claimed in claim 1, wherein the spectrum adjusting module for LED lamps in each growth stage is configured to adjust the spectrum of green light of the LED lamp.

4. The lighting control system as claimed in claim 1, wherein the spectrum adjusting module for LED lamps in each growth stage is configured to adjust the spectrum of far-infrared light of the LED lamp.

5. The lighting control system as claimed in claim 1, wherein the spectrum adjusting module for LED lamps in each growth stage is configured to simultaneously adjust the spectrum of the red light, green light and far-infrared light of the LED lamp.

6. The plant LED lamp lighting control system as claimed in claim 1, wherein the plant growth stage setting module divides the growth stage of a certain type of plant into a seedling stage, a growth stage, a flowering stage and a fruiting stage.

7. The plant LED lamp lighting control system as claimed in claim 1, wherein the lighting control system further comprises a growth total cycle reference module, and the growth total cycle reference module is configured to compare the total time required for plant growth and the time that has been taken to grow for a certain type.

* * * * *